US012043771B2

United States Patent
Beukema et al.

(10) Patent No.: US 12,043,771 B2
(45) Date of Patent: Jul. 23, 2024

(54) METHOD FOR PRODUCING OPTICAL SILICONE ASSEMBLY, AND OPTICAL SILICONE ASSEMBLY PRODUCED THEREBY

(71) Applicant: DOW SILICONES CORPORATION, Midland, MI (US)

(72) Inventors: Martijn Beukema, Ixelles (BE); Thierry Cooremans, Mellet (BE); François De Buyl, Hoeilaart (BE); Kevin Van Tiggelen, Walhain-Saint-Paul (BE)

(73) Assignee: DOW SILICONES CORPORATION, Midland, MI (US)

( * ) Notice: Subject to any disclaimer, the term of this patent is extended or adjusted under 35 U.S.C. 154(b) by 592 days.

(21) Appl. No.: 17/274,503

(22) PCT Filed: Sep. 10, 2019

(86) PCT No.: PCT/US2019/050336
§ 371 (c)(1),
(2) Date: Mar. 9, 2021

(87) PCT Pub. No.: WO2020/055815
PCT Pub. Date: Mar. 19, 2020

(65) Prior Publication Data
US 2021/0324252 A1 Oct. 21, 2021

Related U.S. Application Data

(60) Provisional application No. 62/729,036, filed on Sep. 10, 2018.

(51) Int. Cl.
*B29C 45/14* (2006.01)
*C09J 4/06* (2006.01)
(Continued)

(52) U.S. Cl.
CPC ....... *C09J 183/04* (2013.01); *B29C 45/14311* (2013.01); *C09J 4/06* (2013.01);
(Continued)

(58) Field of Classification Search
CPC .................. B29C 45/14311; C09D 183/04
See application file for complete search history.

(56) References Cited

U.S. PATENT DOCUMENTS 4,978,696 A * 12/1990 Clark ...................... C09J 183/04
524/588
6,663,967 B1 * 12/2003 Ziebell ..................... C08L 83/04
428/447
(Continued)

FOREIGN PATENT DOCUMENTS

| CN | 1182758 A | 5/1998 |
| CN | 103814087 A | 5/2014 |
(Continued)

OTHER PUBLICATIONS

Machine assisted English translation of TW201527474 obtained from https://patents.google.com/patent on Mar. 14, 2023, 13 pages.
(Continued)

*Primary Examiner* — Cachet I Proctor
(74) *Attorney, Agent, or Firm* — Warner Norcross + Judd LLP

(57) ABSTRACT

A method for producing an optical silicone assembly is disclosed. The method comprises the steps of: i) treating a surface of a substrate with an optically clear silicone adhesive composition; ii) placing the substrate obtained by step i) into a mold; iii-a) injecting an optically clear moldable silicone composition into the mold, and/or iii-b) overmolding the optically clear moldable silicone composition onto the substrate; and then iv) heating the optically clear moldable silicone composition to form the optical silicone assem-
(Continued)

bly. The optical silicone assembly produced by the method of this disclosure is characterized by excellent adhesion of an optical silicone product to various types of substrates.

11 Claims, 1 Drawing Sheet

(51) Int. Cl.
  *C09J 7/25* (2018.01)
  *C09J 7/28* (2018.01)
  *C09J 7/38* (2018.01)
  *C09J 183/04* (2006.01)
  *G02B 1/04* (2006.01)
  *B29K 83/00* (2006.01)
  *B29L 11/00* (2006.01)

(52) U.S. Cl.
  CPC ............... *C09J 7/255* (2018.01); *C09J 7/28* (2018.01); *C09J 7/38* (2018.01); *G02B 1/041* (2013.01); *B29C 2045/14868* (2013.01); *B29K 2083/00* (2013.01); *B29L 2011/0016* (2013.01); *C09J 2400/143* (2013.01); *C09J 2400/163* (2013.01); *C09J 2467/006* (2013.01); *C09J 2469/006* (2013.01); *C09J 2483/00* (2013.01)

(56) References Cited

U.S. PATENT DOCUMENTS

| | | | |
|---|---|---|---|
| 6,783,858 | B2 | 8/2004 | Ziebell |
| 7,527,871 | B2 | 5/2009 | Morita et al. |
| 7,651,887 | B2 | 1/2010 | Morita et al. |
| 8,691,910 | B2 | 4/2014 | Hasegawa et al. |
| 8,846,828 | B2 | 9/2014 | Sagawa et al. |
| 8,853,332 | B2 | 10/2014 | Hasegawa et al. |
| 8,859,693 | B2 | 10/2014 | Hasegawa et al. |
| 10,077,338 | B2 | 9/2018 | Mizunashi et al. |
| 2002/0147276 | A1* | 10/2002 | Ziebell ............... C08L 83/04 525/100 |
| 2003/0105262 | A1 | 6/2003 | Mueller et al. |
| 2004/0198924 | A1* | 10/2004 | Young ............... G02B 1/041 525/474 |
| 2006/0073347 | A1 | 4/2006 | Morita et al. |
| 2008/0128929 | A1* | 6/2008 | Colombo ............... G02B 6/138 264/1.24 |
| 2011/0318577 | A1* | 12/2011 | Masuda ............... C09D 183/04 156/60 |
| 2012/0065343 | A1 | 3/2012 | Bahadur et al. |
| 2013/0183776 | A1* | 7/2013 | Kashiwagi ............... H01L 33/56 522/66 |
| 2014/0235806 | A1 | 8/2014 | Miyamoto et al. |
| 2015/0079307 | A1* | 3/2015 | Schadt ............... G02B 19/0066 264/1.7 |
| 2015/0124338 | A1* | 5/2015 | Mayumi ............... C09J 183/04 359/742 |
| 2015/0183960 | A1 | 7/2015 | Yamazaki et al. |
| 2017/0130108 | A1 | 5/2017 | Bradford et al. |
| 2017/0190911 | A1 | 7/2017 | Iimura et al. |
| 2019/0055420 | A1* | 2/2019 | Beyer ............... C08K 5/56 |

FOREIGN PATENT DOCUMENTS

| | | |
|---|---|---|
| CN | 104379673 A | 2/2015 |
| CN | 105733269 A | 7/2016 |
| KR | 1020150129890 A | 11/2015 |
| KR | 101706161 B1 | 2/2017 |
| TW | 201527474 A | 7/2015 |
| TW | 201533200 A | 9/2015 |
| TW | 201723032 A | 7/2017 |

OTHER PUBLICATIONS

International Search Report for PCT/US2019/050336 dated Jan. 8, 2020, 2 pages.
Machine assisted English translation of KR1020150129890A obtained from https://patents.google.com/patent on Mar. 9, 2021, 8 pages.
Machine assisted English translation of KR101706161B1 obtained from https://patents.google.com/patent on Mar. 9, 2021, 8 pages.

* cited by examiner

METHOD FOR PRODUCING OPTICAL SILICONE ASSEMBLY, AND OPTICAL SILICONE ASSEMBLY PRODUCED THEREBY

CROSS-REFERENCE TO RELATED APPLICATIONS

This application is the U.S. National Stage of International Application No. PCT/US2019/050336 filed on 10 Sep. 2019, which claims priority to and all advantages of U.S. Provisional Application No. 62/729,036 filed on 10 Sep. 2018, the content of which is incorporated herein by reference.

TECHNICAL FIELD

The present invention relates to a method for producing an optical silicone assembly, and an optical silicone assembly produced thereby.

BACKGROUND ART

Optical silicone products are used as silicone lenses for LED lighting, silicone light guides, and the like. The optical silicone products are generally produced by curing moldable silicone compositions in a mold, and then the optical silicone products and substrates are assembled into optical silicone assemblies. However, the optical silicone products are generally small parts, so integral optical silicone assemblies are desired because of advantages in assembling operation.

Moldable silicone compositions are generally known (see Patent Documents 1-3). However, one problem with all such moldable silicone compositions, is that due to mold releaseability of silicone products from a metal mold, they have poor adhesion to substrates. Additionally, the silicone products in the optical silicone assemblies must be optically clear, so it is not desirable to add any adhesion promoters in the moldable silicone compositions. In molding processes, it is difficult to selectively adhere to substrates without adhering to metal molds.

PRIOR ART DOCUMENTS

Patent Documents

Patent Document 1: U.S. Pat. No. 8,691,910 B2
Patent Document 2: U.S. Pat. No. 8,853,332 B2
Patent Document 3: U.S. Pat. No. 8,859,693 B2

BRIEF SUMMARY OF INVENTION

Technical Problem

In consideration of the above, an object of the present invention is to provide a method for producing an optical silicone assembly in which an optical silicone product adheres to various types of substrates without decreasing mold release property of the optical silicone assembly, and an optical silicone assembly obtained by the producing method.

Solution to Problem

As a result of diligent research to solve the above problems, the present inventors discovered that an optically clear silicone adhesive composition can form a buffer layer for developing adhesion between the optical moldable silicone composition and the substrates.

That is to say, a first embodiment of the present invention is a method for producing an optical silicone assembly. The method comprises the following steps:
  i) treating a surface of a substrate with an optically clear silicone adhesive composition;
  ii) placing the substrate obtained by step i) into a mold;
  iii-a) injecting an optically clear moldable silicone composition into the mold, and/or
  iii-b) overmolding the optically clear moldable silicone composition onto the substrate; and then
  iv) heating the optically clear moldable silicone composition to form the optical silicone assembly.

In various embodiments, the substrate is made of a thermoplastic, a glass, or a metal. The thermoplastic substrate can be made of polycarbonate (PC) or polybutylene terephthalate (PBT). The glass substrate can be float glass or any other special glass. The metal substrate can be copper or aluminum. The substrate may comprise a combination or two or more materials.

In various embodiments, the optically clear silicone adhesive composition is an addition curable silicone composition. In further embodiments, the addition curable silicone composition comprises:
  (A) 100 parts by mass of an organopolysiloxane having at least two alkenyl groups per molecule;
  (B) an organohydrogenpolysiloxane having at least two silicon atom-bonded hydrogen atoms per molecule, in an amount such that the silicon atom-bonded hydrogen atoms per 1 mole of alkenyl group in component (A) is about 0.1 to about 10 moles;
  (C) about 0.1 to about 10 parts by mass of an adhesion promoter; and
  (D) a hydrosilylation catalyst, in a sufficient amount to accelerate curing of the composition.

In various embodiments, the addition curable silicone composition further comprises a volatile silicone.

In certain embodiments, the method further comprises, between step i) and step ii), the following step:
  i-2) heating the optically clear silicone adhesive composition to form a silicone adhesive layer on the substrate.

An average thickness of the silicone adhesive layer may be in a range of from about 0.01 to about 1 mm.

In various embodiments, the optically clear moldable silicone composition is an addition curable silicone composition.

In certain embodiments, a heating temperature in step iv) is in the range of from about 100° C. to about 150° C.

Another embodiment of the present invention is an optical silicone assembly produced by the above-described method for producing an optical silicone assembly.

Effects of Invention

According to the present invention, the method for producing an optical silicone assembly in which the optical silicone product adheres to various types of substrates without decreasing mold release property of the optical silicone assembly can be provided. In addition, an optical silicone assembly obtained by the producing method can be provided.

DETAILED DESCRIPTION OF THE INVENTION

Figure 1:
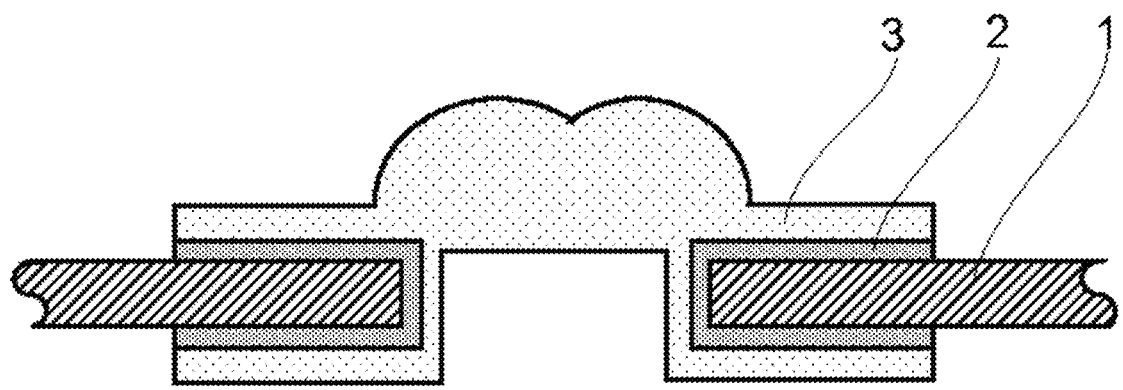
FIG. 1 is a cross-sectional view of a silicone lens assembly that is an example of an optical silicone assembly produced by the method of the present invention.

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The method for producing an optical silicone assembly and the optical silicone assembly according to the present invention is described below using the drawings.

<Method for Producing an Optical Silicone Assembly>

The method for producing an optical silicone assembly according to the present invention includes a step i) of treating a surface of a substrate with an optically clear silicone adhesive composition. As used herein, the term "optically clear" generally means that the silicone (reaction) product obtained from the respective composition has a transmission at 380 nm, 3.2 mm of at least about 87%, alternatively at least about 89%, alternatively at least about 91%; a transmission at 450 nm, 3.2 mm of at least about 89%, alternatively at least about 91%, alternatively at least about 93%; and a transmission at 760 nm, 3.2 mm of at least about 90%, alternatively at least about 92%, alternatively at least about 94%.

As a first embodiment of the present invention, as shown in FIG. 1, a substrate 1 is treated with an optically clear silicone adhesive composition, and the optically clear silicone adhesive composition is cured to form a silicone adhesive layer 2 on the surface of the substrate 1. The substrate 1 is not limited. In various embodiments, the substrate 1 comprises or is made of a thermoplastic, a glass, or a metal. The thermoplastic substrate can comprise or be made of polycarbonate (PC), polybutylene terephthalate (PBT), or the like. The glass substrate can be float glass or any other special glass. The metal substrate can be copper or aluminum. The thermoplastic substrate is generally used as an outer or an inner package for LED lighting.

The optically clear silicone adhesive composition is not limited to a cure system, and may be any system provided that the system contains an addition cure system, a condensation cure system, a peroxide cure system, or the like. In the present invention, the optically clear silicone adhesive composition may be selected from any optically clear silicone adhesive composition known in the art. In various embodiments, the optically clear silicone adhesive composition is an addition curable silicone composition. In certain embodiments, the addition curable silicone composition comprises:

(A) 100 parts by mass of an organopolysiloxane having at least two alkenyl groups per molecule;

(B) an organohydrogenpolysiloxane having at least two silicon atom-bonded hydrogen atoms per molecule, in an amount such that the silicon atom-bonded hydrogen atoms per 1 mole of alkenyl group in component (A) is about 0.1 to about 10 moles;

(C) about 0.1 to about 10 parts by mass of an adhesion promoter; and (D) a hydrosilylation catalyst, in a sufficient amount to accelerate curing of the composition.

Examples of the silicon atom-bonded alkenyl group in component (A) are vinyl groups, aryl groups, butenyl groups, pentenyl groups, and hexenyl groups. In certain embodiments, the silicon atom-bonded alkenyl groups are vinyl groups.

Examples of groups bonded to the silicon atom other than the alkenyl groups in component (A) include monovalent hydrocarbon groups such as methyl groups, ethyl groups, propyl groups, butyl groups, pentyl groups, hexyl groups, heptyl groups, or similar chain alkyl groups; cyclopentyl groups, cyclohexyl groups, or similar cycloalkyl groups; phenyl groups, tolyl groups, xylyl groups, naphthyl groups, or similar aryl groups; benzyl groups, phenethyl groups, 3-phenylpropyl groups, or similar aralkyl groups; chloromethyl groups, 3-chloropropyl groups, 3,3,3-trifluoropropyl groups, nonafluorobutylethyl groups, or similar halogenated hydrocarbon groups.

Examples of the molecular structure of component (A) include straight chain, cyclic, partially-branched straight chain, and branched. In certain embodiments, component (A) comprises at least one type of branched organopolysiloxane from the viewpoint that it can impart sufficient hardness and strength to the obtained silicone product. The viscosity of component (A) can be from about 1 to about 1,000,000 mPa·s at 25° C. Note that in the present specification, viscosity is the value measured using a type B viscometer according to ASTM D 1084 at 23±2° C.

Examples of the groups bonded to silicon other than a hydrogen atom in component (B) include the same monovalent hydrocarbon groups as described above. Examples of the molecular structure of component (B) include straight chain, cyclic, partially-branched straight chain, and branched. In certain embodiments, component (B) comprises a plurality of different structures from the viewpoint of adjusting the hardness and strength of the obtained silicone product. The viscosity of straight chain, cyclic, and partially-branched straight chain component (B) can be from about 1 to about 10,000 mPa·s at 25° C.

The compounded quantity of component (B) in the composition may be an amount sufficient to cure the composition, and the amount of silicon atom-bonded hydrogen atoms in component (B) can be from about 0.1 to about 10 moles per 1 mole of the alkenyl groups in component (A). If the amount of silicon atom-bonded hydrogen atoms in component (B) per 1 mole of alkenyl groups in component (A) is below this range, it may be undesirable because the composition tends to be insufficiently cured. On the other hand, if the amount exceeds this range, it may be undesirable because the mechanical strength of the obtained silicone product tends to be reduced.

The adhesion promoter for component (C) enhances the adhesion of the silicone product to various type of substrates. Component (C) is not limited, but in various embodiments, it is an organosilicon compound having at least one silicon atom-bonded alkoxy group per molecule. The alkoxy groups are exemplified by methoxy groups, ethoxy groups, propoxy groups, butoxy groups, and methoxyethoxy groups. In certain embodiments, the alkoxy groups are methoxy groups.

Furthermore, examples of other groups, excluding the alkoxy group bonded to the silicon atom, of the organosilicon compound include halogen-substituted or unsubstituted monovalent hydrocarbon groups, such as alkyl groups, alkenyl groups, aryl groups, aralkyl groups, and halogenated alkyl groups; glycidoxyalkyl groups, such as 3-glycidoxypropyl groups and 4-glycidoxybutyl groups; epoxycyclohexylalkyl groups, such as 2-(3,4-epoxycyclohexyl)ethyl groups and 3-(3,4-epoxycyclohexyl)propyl groups; epoxyalkyl groups, such as 3,4-epoxybutyl groups and 7,8-epoxyoctyl groups; acrylic group-containing monovalent organic groups, such as 3-methacryloxypropyl groups; and hydrogen atoms.

In various embodiments, the organosilicon compound has a group that can react with an alkenyl group or silicon atom-bonded hydrogen atom in the present composition.

Specifically, the organosilicon compound can have a silicon atom-bonded hydrogen atom or an alkenyl group. Moreover, due to the ability to impart good adhesion to various types of substrates, this organosilicon compound may have at least one epoxy group-containing monovalent organic group in a molecule. This type of organosilicon compound is exemplified by organosilane compounds, organosiloxane oligomers, and alkyl silicates.

Examples of the molecular structure of the organosiloxane oligomer or alkyl silicate include a straight structure, partially-branched straight structure, branched chain structure, cyclic structure, and net-shaped structure. In certain embodiments, the molecular structure is a straight structure, branched structure, or net-shaped structure. Examples of this type of organosilicon compound include silane compounds, such as 3-glycidoxypropyl trimethoxysilane, 2-(3,4-epoxycyclohexyl)ethyl trimethoxysilane, and 3-methacryloxypropyl trimethoxysilane; siloxane compounds having at least one of silicon atom-bonded alkenyl groups or silicon atom-bonded hydrogen atoms, and at least one silicon atom-bonded alkoxy group in a molecule; mixtures of a silane compound or siloxane compound having at least one silicon atom-bonded alkoxy group or siloxane compound having at least one silicon atom-bonded hydroxyl group and at least one silicon atom-bonded alkenyl group in a molecule; and methyl polysilicate, ethyl polysilicate, and epoxy group-containing ethyl polysilicate. In various embodiments, the adhesion-imparting agent is a low-viscosity liquid, and the viscosity is not limited. In further embodiments, the viscosity at 25° C. is in a range of from about 1 to about 500 mPa·s.

The compounded quantity of component (C) in the composition may be in the range of from about 0.1 to about 10 parts by mass per 100 parts by mass of component (A). In further embodiments, component (C) is present in an amount of from about 0.1 to about 5, alternatively about 0.5 to about 2.5, alternatively about 0.5 to about 1, part(s) by mass per 100 parts by mass of component (A).

The hydrosilylation reaction catalyst of component (D) is a catalyst for accelerating crosslinking of the composition. In certain embodiments, the catalyst is a platinum-based catalyst. Examples of platinum-based catalysts include chloroplatinic acid, alcohol solutions of chloroplatinic acid, olefin complexes of platinum, alkenylsiloxane complexes of platinum, platinum black, and platinum-supported silica. The compounded quantity thereof can be from about 1 to about 1,000 ppm in mass units as platinum metal in the composition. In certain embodiments, the amount is not less than about 5 ppm from the viewpoint of accelerating cure of the curing silicone composition, and not greater than about 100 ppm from the viewpoint of increasing heat resistance of the obtained silicone product.

Examples of other optional components that the composition may contain include hydrosilylation reaction inhibitors such as 3-methyl-1-butyn-3-ol, 3,5-dimethyl-1-hexyn-3-ol, 3-phenyl-1-butyn-3-ol, or a similar alkyne alcohol; 3-methyl-3-penten-1-yne, and 3,5-dimethyl-3-hexen-1-yne, or a similar ene-yne compound; 1,3,5,7-tetramethyl-1,3,5,-tetravinylcyclotetrasiloxane, 1,3,5,7-tetramethyl-1,3,5,7-tetrahexenylcyclotetrasiloxane, and benzotriazole. If utilized, the content of the hydrosilylation reaction inhibitor can be from about 10 to about 50,000 ppm of the composition in mass units.

Examples of other optional components that the composition may contain include a volatile silicone to dilute the optically clear silicone adhesive composition. Examples of the volatile silicone include dimethycyclosiloxane oligomer, methylvinylcyclosiloxane oligomer, hexamethyldisiloxane, octamethyltrisiloxane, or the like.

The compounded quantity of the volatile silicone in the composition is not limited, but in various embodiments it is in the range of from about 1 to about 85 mass % of the composition. The dilution factor is adjusted depending on the mode of application of the adhesive composition, i.e., by brushing, spraying, or dip coating for instance.

In the method according to the present invention, the optically clear silicone adhesive composition is disposed at a position so as to contact the optically clear moldable silicone composition around the periphery of the substrate, e.g. thermoplastic substrate.

Between step i) and step ii), the method according to the present invention may include the step i-2) of heating the optically clear silicone adhesive composition to form a silicone adhesive layer on the substrate. The heating temperature is not particularly limited, but good curing of the optically clear silicone adhesive composition is generally obtained at a temperature of from room temperature to about 200° C. In certain embodiments, curing at a temperature of from about 60° C. to about 180° C. is used, and curing at a temperature of from about 80° C. to about 150° C. is used in further embodiments, because it results in strong adhesion between the adhesive silicone layer and the substrate.

Furthermore, step curing can be used, wherein the composite is heated at a temperature of from room temperature to about 100° C., alternatively from about 60° C. to about 80° C., and is then heated at a temperature of from about 80° C. to about 180° C., alternatively from about 100° C. to about 150° C., because adhesion between the adhesive silicone layer and the substrate is further improved in some cases. A state of the silicone adhesive layer after heating is not limited, but may be a semi-cured state or a fully cured state.

In the method according to the present invention, an average thickness of the silicone adhesive layer is not limited, but in various embodiments it is in a range of from about 0.01 to about 1 mm, alternatively in a range of from about 0.02 to about 0.5 mm, alternatively in a range of from about 0.05 to about 0.2 mm.

Then, the method according to the present invention includes a step ii) of placing the substrate obtained by step i) into a mold. The mold is not limited, but in various embodiments it is a metal mold such as stainless steel mold.

Then, the method according to the present invention includes a step iii-a) of injecting an optically clear moldable silicone composition into the mold. Alternatively or in addition to step iii-a), the method according to the present invention includes a step iii-b) of overmolding the optically clear moldable silicone composition onto the substrate. Step iii-a) may also be referred to as injection molding or compression molding of the optically clear moldable silicone composition into the mold.

The optically clear moldable silicone composition is not limited to a cure system, and may be any system provided that the system contains an addition cure system, a condensation cure system, a peroxide cure system, or the like. In various embodiments, the optically clear moldable silicone composition is an addition curable silicone composition. In certain embodiments, the addition curable silicone composition comprises: an organopolysiloxane having at least two alkenyl groups per molecule; an organohydrogenpolysiloxane having at least two silicon atom-bonded hydrogen atoms per molecule; and a hydrosilylation catalyst; and optionally, one or more additives understood in the art. Examples of such components are as described above for components (A), (B), and (D). In specific embodiments, the optically clear moldable silicone composition is a two-part polydimethylsiloxane system having: transmission properties as like described above; a viscosity (mixed) of from about 10 to about 50, alternatively about 15 to about 45, alternatively about 25, Pa·s; and/or a Shore A hardness of from about 45 to about 90, alternatively about 55 to about 80, alternatively about 65 to about 75; and/or a tensile strength of from about 5 to about 15, alternatively about 10 to about 15, alternatively about 12 to about 15, MPa; and/or an elongation of from about 50 to about 350, alternatively about 60 to about 200, alternatively about 70 to about 100, %; and/or a refractive index at ~633 nm of from about 1.35 to about 1.5, alternatively about 1.4 to about 1.45, alternatively about 1.4.

The optically clear moldable silicone composition may be selected from any optically clear moldable silicone composition known in the art. Examples thereof include, but are not limited to, moldable silicones commercially available from Dow Silicones Corporation of Midland, MI under the "DOWSIL™ MS" trademark/name, including DOWSIL™ MS-1001 Moldable Silicone, DOWSIL™ MS-1002 Moldable Silicone, and DOWSIL™ MS-1003 Moldable Silicone, or any combinations thereof.

Then, the method according to the present invention includes a step iv) of heating the optically clear moldable silicone composition to form the optical silicone assembly. The heating temperature is not particularly limited, but good curing of the optically clear moldable silicone composition is generally obtained at a temperature of from room temperature to about 200° C. In certain embodiments, curing at a temperature of from about 60° C. to about 180° C. is used, and curing at a temperature of from about 80° C. to about 150° C. is used in further embodiments, because it results in strong adhesion between the adhesive silicone layer and the optical silicone.

Furthermore, step curing can be used, wherein the composite is heated at a temperature of from room temperature to 100° C., alternatively from about 60° C. to about 80° C., and is then heated at a temperature of from about 80° C. to about 180° C., alternatively from about 100° C. to about 150° C., because adhesion between the adhesive silicone layer and the optical silicone is further improved in some cases. When the substrate is a thermoplastic, the curing temperature should not exceed the melting temperature of the thermoplastic substrate for preventing thermoplastic substrate deformation. In case of overmolding onto glass or metal, there is no upper limit of temperature of molding.

<Optical Silicone Assembly>

The optical silicone assembly of the present invention will now be explained. The optical silicone assembly according to the present invention is characterized by being produced by the above-described producing method.

Figure 2:
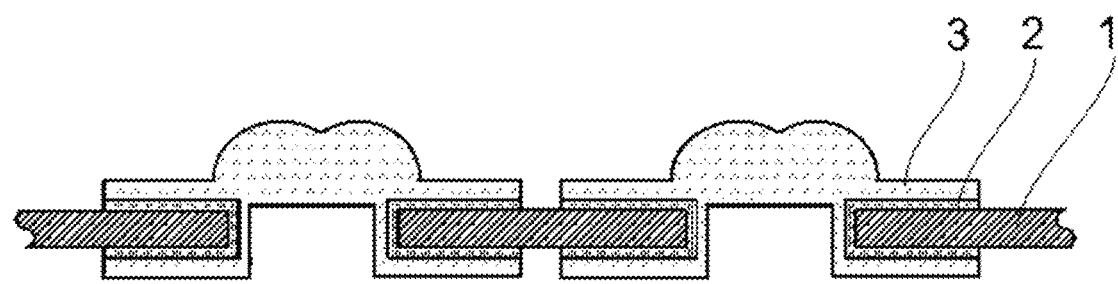
FIG. 2 is a cross-sectional view of a plural silicone lens assembly that is another example of the optical silicone assembly produced by the method of the present invention.

An example of such an optical silicone assembly of the present invention is an outer package for LED lighting (see FIGS. 1 and 2). In the optical silicone assembly of FIG. 1, it is composed of a substrate 1, a silicone adhesive layer 2, and an optical silicone (silicone lens) 3. The substrate 1 functions as a frame material (packaging material) of the optical silicone assembly, and the silicone adhesive layer 2 functions as an adhesive buffer layer of the optical silicone (silicone lens) 3. In the optical silicone assembly of FIG. 2, it is composed of a substrate 1, a silicone adhesive layer 2, and a plurality of optical silicones (silicone lenses) 3. In the optical silicone assembly of FIG. 2, there are two optical silicones 3, but it is not limited, and can be two or more.

EXAMPLES

The method for producing an optical silicone assembly and the optical silicone assembly of the present invention will now be described in detail using Examples. In the Examples, the viscosity is the value at 25° C.

Practical Example 1

In a first series of examples, the substrate used was floated glass. The silicone adhesive layer was applied from dilutions with octamethyltrisiloxane as a volatile silicone solvent of 95%, 91%, 67%, and 17% optically clear silicone adhesive composition in the silicone solvent.

In the examples, the optically clear silicone adhesive composition was prepared by mixing the following to uniformity:
- 26 parts by mass of a resinous organopolysiloxane consisting of $ViMe_2SiO_{1/2}$ siloxane units, $Me_3SiO_{1/2}$ siloxane units and $SiO_{4/2}$ siloxane units, and having a vinyl group content of 4.2 mass % (where "Vi" is a vinyl group, and "Me" is a methyl group);
- 40 parts by mass of a dimethylpolysiloxane capped at both molecular terminals with dimethylvinylsiloxy groups and having a viscosity of 10,000 mPa·s and a vinyl group content of 0.13 mass %;
- 29 parts by mass of a dimethylpolysiloxane capped at both molecular terminals with dimethylvinylsiloxy groups and having a viscosity of 400 mPa·s and a vinyl group content of 0.44 mass %;
- 4.2 parts by mass of a methylhydrogenpolysiloxane capped at both molecular terminals with trimethylsiloxy groups and having a viscosity of 20 mPa·s and a silicon atom-bonded hydrogen atoms content of 1.5 mass %, in a quantity that provided 1.3 moles of silicon atom-bonded hydrogen atoms in this component per 1 mole of total amount of vinyl groups in the preceding three polysiloxanes;
- 0.10 parts by mass of a 1,3-divinyltetramethyldisiloxane solution of a platinum/1,3-divinyltetramethyldisiloxane complex, which contains approximately 6,000 ppm platinum metal; and
- 0.5 parts by mass of a reaction mixture of silicon atom-bonded hydroxyl groups capped methylvinylsiloxane-dimethylsiloxane oligomer and 3-glycidoxypropyl trimethoxysilane as an adhesion promoter.

Next, two method of applications were tested. Either wiping on the glass substrate the liquid with a paper tissue impregnated by the solution, or spraying on the glass substrate with air pressure using low pressure aerograph equipment. The adhesive layer was then left drying for 5 to 20 minutes at 150° C. in an air circulating oven to form the silicone adhesive layer with a thickness of 0.1 mm. After the adhesive layer was dried, overmolding with an optically clear moldable silicone composition was carried out in a press mold with a pressure between 20 to 100 bars at a temperature of from 120 to 180° C. for 15 to 30 minutes. The optically clear (e.g. a transmission at 380 nm, 3.2 mm of 89%, at 450 nm, 3.2 mm of 91%; and a transmission at 760 nm, 3.2 mm of 94%) moldable silicone composition is a medium viscosity (e.g. ~26 Pa·s mixed), higher (e.g. ~72-74) Shore A hardness, two-part, 1:1 ratio, fast curing (e.g. cure/demold time at 140° C., 6×12×125 mm of <60 sec) polydimethylsiloxane resin, which is commercially available from Dow Silicones Corporation. Results showed that adherence was well developed across the optical silicone/glass substrate interface since after peeling the optical silicone, a cohesive failure was observed.

Comparative Examples

Comparative examples where the silicone adhesive layer in Practical Example 1 was replaced by already known and commercial silicone primer solutions did not show good results. The comparative examples used the following commercial materials:
- DOWSIL™ 1200 OS Primer
- DOWSIL™ P5200 Primer Clear
- DOWSIL™ 92-023 Primer
- 3-glycidoxypropyl trimethoxysilane diluted into the volatile silicone solvent at 91%, 83%, and 67% active Practical Example 2

In a second series of examples, the silicone adhesive layer was applied from the dilution with octamethyltrisiloxane as a volatile silicone solvent of 67% optically clear silicone adhesive composition prepared in Practical Example 1 in the silicone solvent, applying the solution by spraying, drying for 5 to 20 minutes at 150° C. in an air circulating oven to form the silicone adhesive layer with a thickness of 0.1 mm, followed by overmolding with an optically clear moldable silicone composition (the same as in Practical Example 1) in a press mold with a pressure between 20 to 100 bars at a temperature of from 120 to 180° C. for 15 to 30 minutes. Results with good adherence rating (i.e., cohesive failure at the interface between the substrate and the optical silicone) were obtained on the following substrates:
- Polycarbonate (PC) (MAKROLON® AL2447 produced by Bayer MaterialScience AG)
- Polybutylene terephthalate (PBT) (CELANEX® 3709HR Black produced by Ticona GmbH)
- PBT (ULTRADUR® B4300 G6Q16 Black produced by BASF Corp.)
- Glass Fiber Reinforced Epoxy (FR4)
- Aluminum anodized AlMg (ref 5005 E6EV1)
- Aluminum AlMg3 (ref 5753)
- Copper

INDUSTRIAL APPLICABILITY

According to the present invention, a method for producing an optical silicone assembly in which the optical silicone product adheres to various type of substrates can be provided. Thus, the method is suitable for producing silicone lens assemblies for LED lighting.

REFERENCE SIGNS LIST

1 Substrate
2 Silicone adhesive layer
3 Optical silicone (Silicone Lens)

What is claimed is:
1. A method for producing an optical silicone assembly, said method comprising the steps of:
   i) treating a surface of a substrate with an optically clear silicone adhesive composition;
   i-2) heating the optically clear silicone adhesive composition to form a silicone adhesive layer on the substrate;
   ii) placing the substrate obtained by step i) into a mold;

iii-a) injecting an optically clear moldable silicone composition into the mold, and/or iii-b) overmolding the optically clear moldable silicone composition onto the substrate; and then iv) heating the optically clear moldable silicone composition to form the optical silicone assembly;

wherein the optically clear silicone adhesive composition comprises an addition curable silicone composition comprising:

(A) 100 parts by mass of an organopolysiloxane having at least two alkenyl groups per molecule;

(B) an organohydrogenpolysiloxane having at least two silicon atom-bonded hydrogen atoms per molecule, in an amount such that the silicon atom-bonded hydrogen atoms per 1 mole of alkenyl group in component (A) is about 0.1 to about 10 moles;

(C) about 0.1 to about 10 parts by mass of an adhesion promoter;

(D) a hydrosilylation catalyst, in a sufficient amount to accelerate curing of the composition; and (E) a volatile silicone.

2. The method according to claim 1, wherein the substrate comprises or is made of a thermoplastic.

3. The method according to claim 1, wherein the substrate comprises or is made of a glass.

4. The method according to claim 1, wherein the substrate comprises or is made of a metal.

5. The method according to claim 1, wherein the volatile silicone (E) is:

a) dimethycyclosiloxane oligomer, methylvinylcyclosiloxane oligomer, hexamethyldisiloxane, or octamethyltrisiloxane;

b) present in an amount of from about 1 to about 85 mass % of the addition curable silicone composition; or c) both a) and b).

6. The method according to claim 1, wherein an average thickness of the silicone adhesive layer is in a range of from about 0.01 to about 1 mm.

7. The method according to claim 1, wherein step iii-a) is used.

8. The method according to claim 1, wherein step iii-b) is used.

9. The method according to claim 1, wherein the optically clear moldable silicone composition comprises an addition curable silicone composition.

10. The method according to claim 1, wherein a heating temperature in step iv) is in the range of from about 100° C. to about 150° C.

11. An optical silicone assembly produced by the method according to claim 1.

* * * * *